Aug. 16, 1966  E. H. PHILLIPS  3,266,515

FLUID PRESSURE LEADSCREW FOLLOWER

Filed Feb. 24, 1964

*INVENTOR.*
EDWARD H. PHILLIPS

BY

AGENT

United States Patent Office 3,266,515
Patented August 16, 1966

3,266,515
FLUID PRESSURE LEADSCREW FOLLOWER
Edward H. Phillips, Mountain View, Calif., assignor to Philsen Products, Inc., San Jose, Calif., a corporation of California
Filed Feb. 24, 1964, Ser. No. 346,696
6 Claims. (Cl. 137—85)

This invention relates to leadscrew following apparatus which operates on fluid under pressure to provide highly accurate positioning of a workpiece or other element.

It is an object of the present invention to provide apparatus which follows a leadscrew with extremely high positional accuracy.

It is another object of the present invention to provide rotatable leadscrew apparatus which follows the position of a threaded member engaged with the leadscrew.

It is still another object of the present invention to provide a leadscrew and follower assembly which is quickly and roughly adjustable about a given position in the absence of fluid under pressure and which is accurately adjustable to within a few millionths of an inch of a desired position in the presence of fluid under pressure.

It is still another object of the present invention to provide apparatus for accurately following and reproducing the instantaneous positions of a longitudinally movable element.

In accordance with the illustrated embodiment of the present invention a rotatable leadscrew having threads with tapered sides determines the proper position of a leadscrew follower which coacts therewith. The follower includes a threaded inner aperture for receiving the leadscrew. The tapered sides of these threads fit closely against the adjacent sides of the leadscrew threads which are remote from the center of the follower and fit loosely against the sides of the leadscrew threads adjacent to the center of the follower assembly. Fluid under pressure flows through a constriction to the space between the threads of the follower and the threads of the leadscrew. A fluid pressure outlet is provided in each of these fluid flow paths for supplying an output pressure which represents the error in position of the follower upon the leadscrew. A control mechanism receives these output pressures and controls either a device actuating the leadscrew or a device for moving the follower longitudinally along the leadscrew in order to equalize the output pressures and thereby center the follower about a position on the leadscrew.

Figure 1:
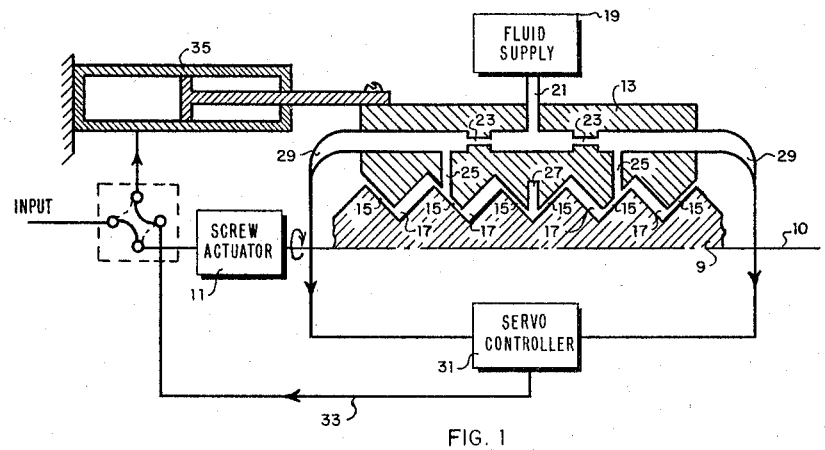
Figure 2:
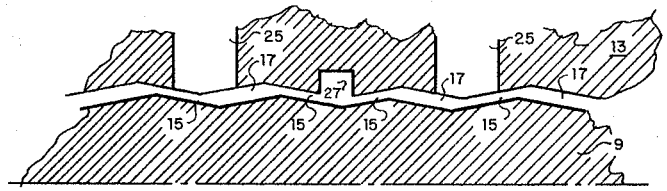
Figure 3:
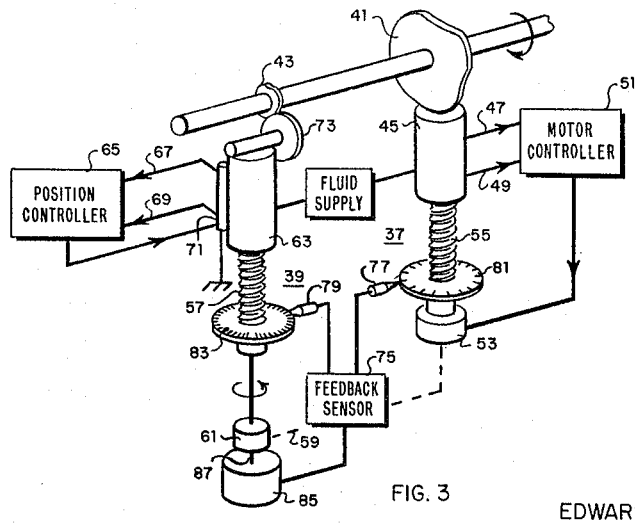

Other and incidental objects of the present invention will be apparent from a reading of this specification and an inspection of the accompanying drawing in which FIGURE 1 is a sectional view of the leadscrew and follower assembly;

FIGURE 2 is a sectional view of a follower which is slidably positionable upon a leadscrew in the absence of fluid under pressure; and FIGURE 3 is a pictorial view of apparatus using a pair of leadscrew and follower assemblies for reproducing an irregularly shaped piece with extremely high accuracy.

Referring to FIGURE 1, there is shown a leadscrew 9 rotatable about axis 10 by screw actuator 11. Only one-half of the assembly about the axis 10 is shown for clarity. The follower 13 includes threads having the same shape as the leadscrew threads which fit closely on the sides 15 of the leadscrew threads and which fit loosely in the sides 17 of the leadscrew threads. The threads of the follower 13 may also be displaced inwardly about the central flow outlet 27 rather than displaced outwardly, as shown. Fluid under pressure above ambient flows from fluid supply 19 through the inlet flow passage 21 and constrictions 23 to the fluid ducts 25 which communicate on both sides of the central flow outlet 27 with the space between the threads of the leadscrew 9 and the threads of the follower 13. Each of the ducts 25 is shown terminated in the space between closely fitting sides only of the leadscrew and follower threads. In practice, these ducts are sufficiently wide to span several thread crests. Pressure outlets 29 are provided on the same sides of constrictions 23 as the fluid ducts 25.

In operation, the fluid under pressure flowing through ducts 25 encounters resistance to flow attributable to the close spacing between the threads. The pressure drop through this spacing varies approximately as the third power of the spacing dimension. Thus, if the follower 13 is properly positioned on the leadscrew 9, this resistance to flow is uniform on both sides of flow outlet 27 and the resulting pressures at the pressure outlets 29 are substantially equal. However, if the follower 13 is shifted slightly to one side of the desired position, say toward the left, then the resistance to flow of fluid in the left duct 25 increases substantially as the third power of the change in spacing (due to the decrease in spacing at 15) and decreases in the right duct substantially as the inverse third power of the change in spacing. This causes a rise in the pressure at the left pressure outlet 29 and a drop in pressure at the right pressure outlet 29. Servo controller 31 responds to this pressure differential to produce an output signal on line 33 which is related to the shift of follower 13 from the desired position.

In one embodiment of the invention in which the screw actuator is excited by an applied signal, the output signal on line 33 is applied to a positioning device such as cylinder 35 connected to follower 13 to center the follower 13 about the position on screw 9 which yields a negligible pressure differential at pressure outlets 29.

In another embodiment of the invention in which the follower 13 is positionally actuated by cylinder 35 or other input means, the output signal on line 33 is applied to screw actuator 11 to rotate screw 9 in a direction to maintain substantially zero pressure differential at the pressure outlets 29.

In FIGURE 2, the inner diameter of the threads of follower 13 is shown slightly larger than the outer diameter of the threads on leadscrew 9. This permits the follower 13 to be longitudinally positioned along the screw 9 in the absence of fluid under pressure without rotating the screw 9. However, by supplying fluid under pressure through ducts 25 to the spacing between the threads the system again responds to relative positioning of the screw 9 and follower 13, as previously described.

The apparatus of FIGURE 3 uses a pair of the leadscrew-follower assemblies 37 39 as shown in FIGURE 1 or FIGURE 2 to reproduce a part 41 of a complex shape at a related size 43 with extremely high accuracy of reproduction. The follower 45 of the first assembly 37 is actuated by the outline shape of rotating part 41. The motor controller 51 operating on the pressure outlets 47, 49 of the follower 45 and the motor 53 cause the leadscrew 55 to rotate sufficiently rapidly in the proper direction to maintain pressure balance at pressure outlets 47 and 49. The rotation of leadscrew 55 where feedback correction is to be applied, may be directly coupled to leadscrew 57 of assembly 39. This coupling may be through one input of a differential 61 while the feedback connection is applied to another input 87 of differential 61. Leadscrew 57 may have a different thread pitch or may be rotated through suitable gearing at a different angular velocity from that of leadscrew 55 and thus may produce a different translational movement of follower 63 per revolution of leadscrew 57 than is produced in the assembly 37. The position controller 65 operating on pressure outlets 67, 69 of follower 63 so actuates the positioning cylinder 71 as to move the follower 63 to maintain pressure balance at pressure outlets 67 and 69. A work-shaping tool such as grinding wheel 73 attached to follower 63 thus reproduces the master part 41 as a part 43 of related size.

The reproduction accuracy of the system may be enhanced by the feedback system including the sensor 75 and the pickups 77, 79 associated with the marker wheels 81 and 83 attached, respectively, to leadscrews 55 and 57. As leadscrew 55 rotates in response to the positioning of follower 45, markers on wheel 81 pass the pickup 77 and produce marker signals which are applied to sensor 75. These signals are compared in number and phase relationship with marker signals produced by markers on wheel 83 passing pickup 79 as the leadscrew 57 rotates. The error signal produced by sensor 75 in response to the combination of marker signals received thereby is applied to motor 85 which in turn supplies rotational correction to leadscrew 57 through the other input 87 of differential 61. The output of feedback sensor 75 may also supply information relating to the deviation of part 43 from the shape of master part 41 where the apparatus of FIGURE 3 is used as an inspection device. In such applications the work-shaping tool 73 is replaced by an inspection pointer and both leadscrews are rotated to maintain pressure balance at the pressure outlets of the respective followers.

In remotely-controlled reproduction applications where the rotational coupling of screw 55 to screw 57 through differential input 59 is impractical, the pickups, sensor 75 and motor 85 may provide the rotational coupling to screw 57. The number and phase relationship of markers passing pickup 77 causes sensor 75 to actuate motor 85 which rotates screw 57. Follower 63 on leadscrew 57 is thus properly positioned when the number of markers on wheel 83 passing pickup 79 bears a preselected relationship to the number of markers on wheel 81 passing pickup 77. Varying the relative numbers of markers on the wheels 81 and 83 and the relative pitch of threads on leadscrews 55 and 57 thus determines the relative motion of the followers and hence the relative size of the reproduced part 43.

I claim:
1. Fluid-pressure apparatus comprising:
   a rotatable leadscrew including a helical thread thereon having oppositely facing thread surfaces;
   a follower disposed about said leadscrew and having a helical thread therein for engaging the thread of the leadscrew;
   the thread of the follower being displaced axially in opposite directions with respect to a point along the length of said follower intermediate the ends thereof;
   a supply of fluid under pressure above ambient;
   a plurality of ducts connecting said supply to the space between the threads of said leadscrew and follower on opposite sides of said point; and
   a fluid outlet in said follower intermediate said ducts and communicating with the space between the threads of said leadscrew and follower.

2. Apparatus as in claim 1 wherein the threads of said follower are displaced axially outwardly away from a point along the length of said follower intermediate the ends thereof; and
   each of said ducts includes a flow-constricting aperture;
   a pressure outlet in each of said ducts on the side of said aperture remote from said supply;
   pressure-sensing apparatus connected to said pressure outlets for producing an output signal related to the combination of fluid pressures at said pressure outlets;
   first means to rotate said leadscrew about the longitudinal axis of said leadscrew; and
   second means to move said follower along the longitudinal axis of said leadscrew; and
   means for applying said output signal to one of said first and second means for maintaining a predetermined pressure relationship at said pressure outlets as the other of the first and second means is actuated.

3. Fluid-pressure positioning apparatus comprising:
   a leadscrew including a helical thread thereon having oppositely facing thread surfaces;
   a follower disposed about said leadscrew and having a helical thread therein for engaging the thread of the leadscrew;
   the thread of the follower on one side of a point on the follower intermediate the ends thereof communicating more closely with one of the thread surfaces of said leadscrew than with the other of said surfaces and on the other side of said point communicating more closely with said other thread surface of the leadscrew than with said one thread surface;
   a supply of fluid under pressure above ambient;
   a plurality of ducts connecting said supply to the space between the threads of said leadscrew and follower on opposite sides of said point; and
   a fluid outlet in said follower intermediate said ducts and communicating with the space between the threads of said leadscrew and follower.

4. Apparatus as in claim 3 wherein the outside diameter of the leadscrew thread is smaller than the inside diameter of the follower thread.

5. Positional servo apparatus comprising:
   at least two leadscrews having helical threads thereon;
   a follower for each leadscrew disposed thereabout and having a helical thread therein for engaging the thread on the leadscrew;
   the threads of said followers being displaced axially outwardly away from the central regions of said followers;
   a supply of fluid under pressure above ambient;
   a plurality of ducts in said followers, each including a flow-constricting aperture, connecting said supply to the space between said threads at points about said central regions;
   pressure sensors for said followers;
   pressure outlets connecting said ducts at the sides of said apertures remote from said supply to said pressure sensors;
   means for positioning one of the followers along the longitudinal axis of the corresponding leadscrew;
   means for rotating said corresponding leadscrew in response to changes in the pressures at the pressure outlets of said one follower to maintain said pressures balanced;
   means to rotate the other leadscrew in response to rotation of said corresponding leadscrew; and
   means for positioning the follower corresponding to said other leadscrew in response to changes in pressures at the pressure outlets of the last-named follower to maintain said pressures balanced.

6. Apparatus as in claim 5 including:
   sensing means attached to each of said leadscrews for sensing the angular displacements thereof;
   connecting means responsive to signals from said sensing means for producing rotational output related to the combination of angular displacements of said leadscrews; and
   means to rotate said other leadscrew in response to the combination of said rotational output and the rotation of said corresponding leadscrew.

No references cited.

WILLIAM F. O'DEA, *Primary Examiner.*

A. COHAN, *Assistant Examiner.*